United States Patent [19]

Spiegelman

[11] 3,969,470

[45] July 13, 1976

[54] PROCESS FOR RECYCLING HYDROGEN WHEN MAKING BLENDS OF OLEFIN COPOLYMERS

[75] Inventor: Phillip Poliner Spiegelman, Wilmington, Del.

[73] Assignee: E. I. Du Pont de Nemours and Company, Wilmington, Del.

[22] Filed: Apr. 21, 1975

[21] Appl. No.: 570,260

[52] U.S. Cl. .............................. 260/897 A; 260/896; 526/68; 526/70; 526/89; 526/154; 526/339; 526/905
[51] Int. Cl.² .................. C08L 23/08; C08L 23/14; C08L 23/16
[58] Field of Search ........... 260/897 A, 896, 94.9 F, 260/94.9 P, 88.2 R, 80.78

[56] References Cited
UNITED STATES PATENTS

| | | | |
|---|---|---|---|
| 3,380,978 | 4/1968 | Ryan et al. | 260/88.2 |
| 3,770,709 | 11/1973 | Tegge et al. | 260/94.9 F X |
| 3,914,342 | 10/1975 | Mitchell | 260/897 A |

Primary Examiner—Carman J. Seccuro

[57] ABSTRACT

A continuous process for recycling hydrogen for reuse in making blends of olefin copolymers of high and low molecular weights which comprises copolymerizing ethylene with at least one higher olefin monomer in a solvent in separate reactors in the presence of a coordination catalyst, at least one, but not all, of said reactors containing hydrogen in an amount sufficient to produce low molecular weight copolymer. The resulting solutions of high and low molecular weight copolymers are mixed, unreacted monomers and hydrogen are flashed from the mixture, and the copolymer blend is isolated from the unflashed residue. The flashed gaseous unreacted monomers and hydrogen are circulated together through a staged absorption column under superatmospheric pressure and simultaneously solvent is passed through said column in order to absorb monomer in the solvent and thus separate unabsorbable hydrogen gas from the monomers for recycle to a polymerization reactor in the system for making low molecular weight copolymer component.

13 Claims, 1 Drawing Figure

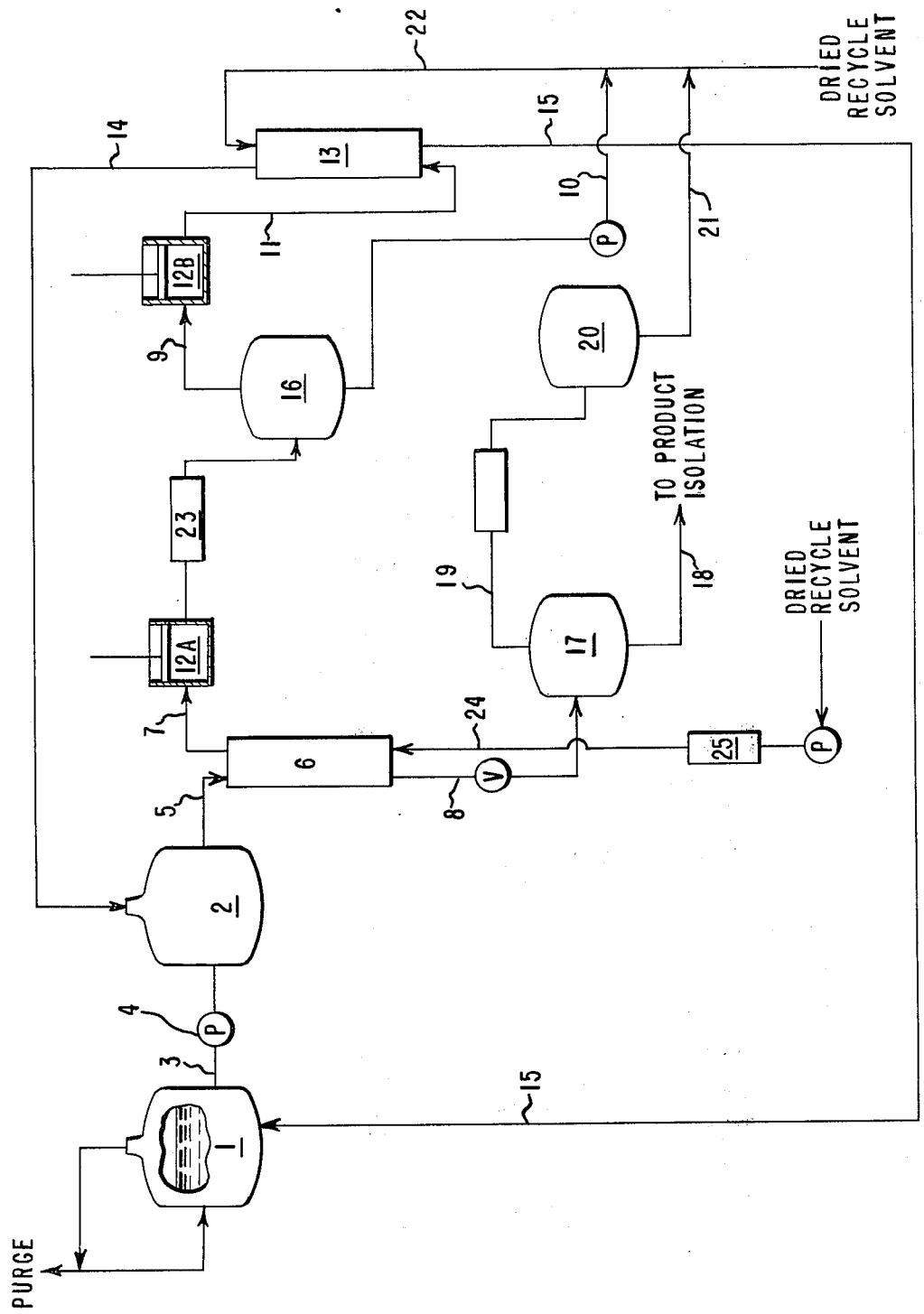

PROCESS FOR RECYCLING HYDROGEN WHEN MAKING BLENDS OF OLEFIN COPOLYMERS

BACKGROUND OF THE INVENTION

This invention relates to a process for making a blend of olefin copolymers having different molecular weights and, more particularly, to such a process in which gaseous hydrogen is recovered for reuse as a chain-transfer agent in a single monomer recovery and recycle system for making blends of high and low molecular weight olefin copolymers.

Copolymers prepared by copolymerizing ethylene with a higher olefin, e.g., propylene and, optionally, nonconjugated dienes, are well known commercial products. Efficient manufacture of these products requires a copolymer synthesis process which involves continuously feeding a coordination catalyst and monomers to a reactor having a liquid phase where copolymerization occurs, continuously removing a portion of this liquid (containing a mixture of copolymer, unreacted monomers, catalyst residue and solvent) in order to isolate the copolymer product, recovering unreacted monomers and solvent and recycling them to the reactor.

It is known that blends of high and low molecular weight olefin copolymers display better processing properties than do the high or low molecular weight copolymers themselves. Therefore, suitable copolymer components for these blends are prepared by using chain-transfer agents such as hydrogen in the reactor liquid phase during copolymerization therein to control the molecular weight of the copolymer being formed. The chain-transfer agent terminates the growth of the copolymer molecule by displacing the coordination catalyst without deactivating it; a catalyst site is thereby made available for making a new copolymer molecule. The higher the concentration of the chain-transfer agent in the reactor liquid phase, the lower the molecular weight of the resulting polymer. Chain-transfer agents are especially attractive to use to control molecular weight of copolymers because they do not alter the copolymer composition.

In order to produce blends of olefin copolymers having different molecular weights usually two continuous reactors, operating simultaneously, are used in which the hydrogen concentrations in the liquid phases are different. Usually, at least about 10% by weight of the total copolymer blend is made in each reactor.

After the polymer blend is made it can be separated from unreacted monomers and hydrogen in a conventional manner by flashing, for example, in a stripper. However, a serious problem arises concerning reuse of hydrogen and unreacted monomers. Due to the large proportion of monomers in the resulting stripper off-gas mixture, one cannot split and recycle the gaseous mixture among the reactors in order to maintain the desired hydrogen concentrations in the liquid reaction zones and, at the same time, maintain the monomer concentration ratios desired therein. If the off-gas stream is split to apportion the hydrogen properly, incorrect monomer ratios result; if the stream is split to apportion the monomers properly, then hydrogen distribution is unsatisfactory. There is no practical or commercially feasible technique for apportioning the hydrogen in the off-gas stream to a reactor in which high molecular weight polymer is being made without first purging to the atmosphere most of the stripper off-gas stream being recycled, thereby losing not only hydrogen but substantial amounts of increasingly scarce and expensive unreacted monomers. Accordingly, there is a need for a process in which hydrogen can be recovered and recycled in preselected concentrations to separate reactors to regulate molecular weight of the copolymer components of a blend and at the same time permit independent product composition control so that a preselected ratio of monomer units is contained in the copolymers.

SUMMARY OF THE INVENTION

The present invention provides a process for making a blend of copolymers wherein said copolymer components of the blend have different molecular weights, and to such a process in which the chain-transfer agent, hydrogen, and unreacted monomers are recycled to the copolymerization reactors for reuse in the system. By "copolymer component" is meant the copolymer produced in a single copolymerization reactor. More particularly, the present invention is directed to a continuous process for making blends of high and low molecular weight copolymers and recycling the chain-transfer agent, gaseous hydrogen, for reuse in the process, said process comprising polymerizing ethylene and at least one higher olefin monomer in a solvent for the monomers in separate reactors in the presence of a coordination catalyst, at least one, but not all, of said reactors containing the chain-transfer agent hydrogen in an amount sufficient to produce low molecular weight copolymer, mixing the resulting solutions of high and low molecular weight copolymers, flashing unreacted monomers and hydrogen from the mixture, and isolating the blend of high and low molecular weight copolymers and solvent from the unflashed residue, the improvement which comprises circulating the flashed gaseous unreacted monomers and hydrogen together through a staged absorption column and simultaneously passing fresh or recycle solvent through said column to absorb monomer gas in the solvent and thus separate unabsorbable hydrogen gas from monomers and recycling hydrogen in the system to a polymerization reactor for making low molecular weight copolymer. Usually the solvent used is a hydrocarbon; the gaseous hydrogen and unreacted monomers are passed countercurrent to the flow of solvent in the absorption column; and the monomers are ethylene and propylene. The partitioning of hydrogen from monomers permits the recycling of hydrogen and monomers in preselected amounts to polymerization reactors so that molecular weight and product composition can be controlled.

DETAILED DESCRIPTION OF THE INVENTION

The invention can be more readily understood by referring to the schematic drawing in connection with the detailed description of making blends of olefin copolymers having different molecular weights, and the recovery and recycle of the hydrogen chain-transfer agent and monomers for reuse in the system.

The drawing depicts a representative process of the present invention illustrating two reactors in series with a common monomer recovery and recycle system. The concentration of hydrogen in the reactor liquid phase producing the low molecular weight copolymer is at least about three times greater than the concentration of hydrogen in the reactor liquid phase producing the high molecular weight copolymer. The monomers to be polymerized are added to evaporatively cooled reactor 1 together with the coordination catalyst, hydrogen, and solvent. The copolymerization reaction is conducted therein in a conventional manner and a solution of the resulting high molecular weight copolymer is circulated to liquid-full reactor 2 through line 3 by means of pump 4. While copolymerization is occurring in reactor 1, monomers, coordination catalyst, make up hydrogen and solvent are, at the same time, being independently fed through appropriate lines to upstream reactor 2, where copolymerization is also occurring in the presence of recycled hydrogen to produce the low molecular weight copolymer component needed to make a blend of copolymers. A solution of the resulting blend of high and low molecular weight copolymer is passed through line 5 to stripper 6 where unreacted monomers and hydrogen are removed as gases by contact with a hot gas stream flowing through line 24. The hydrogen and gaseous monomers are circulated via line 7 to a compressor and a series of condensers and thence to line 11 and into staged absorption column 13. The residual polymer blend, together with solvent and monomers, is removed as liquid through line 8 and after flashing in separator 17 (to remove some of the remaining monomers) is fed to a product isolation area via line 18. There the blend of polymers is separated from solvent in a conventional manner. Solvent is recovered, dried, and returned to a recycle solvent feed system applying solvent to stripper 6 (via line 24) and to staged absorption column 13 (via line 22). In the product isolation area (not depicted), the copolymer blend is dried and packaged.

The off-gases from stripper 6 are primarily unreacted monomers and hydrogen. The mixture of hydrogen and monomer gas passes through line 7 to the first stage of a compressor 12A. Gas from the first stage is fed to an interstage cooler-condenser 23 and condenser separator 16 from which condensate is removed via line 10 for recycle. The remaining gas flows via line 9 to the second stage of the compressor 12B. From there the gas mixture is fed via line 11 to staged absorption column 13 (at or near the bottom). As the mixture of gases under superatmospheric pressure contacts the liquid recycle solvent in absorption column 13, the monomer gas transfers to the liquid by dissolving therein and hydrogen gas is partitioned. Most of the hydrogen is unabsorbed by the liquid stream entering through line 22 and thus exits at or near the top of staged absorption column 13 through vapor line 14 to be recycled to downstream reactor 2 in which low molecular weight copolymer is being made. The solvent, together with absorbed monomer gases, exits through line 15 at or near the bottom of absorption column 13 and is recycled to upstream reactor 1 in which high molecular weight copolymer is being made. The small amount of hydrogen absorbed by liquid stream 15 thus is returned to reactor 1.

Occasionally, a small purge of the gas in the system is necessary in order to keep adventitious inerts such as nitrogen, methane, ethane and propane from accumulating. The purge rate is set to maintain a steady-state level of inerts throughout the system by removing these components, for example, from upstream reactor 1, at the rate they are introduced into the system.

Alternatively, the polymerization reactors can be in parallel arrangement with respect to the feed of reactants in which case the polymers are blended in stripper 6 where polymer and solvent are separated from unreacted monomer and gaseous hydrogen.

The invention is useful for making blends of copolymers containing ethylene units (usually containing less than about 85% ethylene by weight) and units of at least one higher olefin. Generally, the olefin is a higher alpha-olefin that can be represented by the formula $RCH_2-CH=CH_2$, where R is hydrogen or an alkyl group of 1–15, preferably 1–4, carbon atoms; propylene is particularly preferred. Preferred copolymers are the well known EPM and EPDM rubbers, i.e., ethylene/propylene dipolymers (e.g. as in U.S. Pat. Nos. 3,000,867 and 3,300,459) and ethylene/propylene/nonconjugated diene terpolymers in which the diene contains only one polymerizable double bond and usually has 6–22 carbon atoms (e.g., as in U.S. Pat. Nos. 2,933,480; 3,000,866; 3,063,973; 3,093,620; 3,093,621; 3,211,709). Representative dienes include: open-chain aliphatic dienes such as 1,4-hexadiene; dicyclopentadiens, such as dicyclopentadiene; alkylidene norbornenes such as 5-methylene-2-norbornene and 5-ethylidene-2-norbornene; 5-alkyl-2,5-norbornadienes such as 5-ethyl-2-5,norbornadiene; and 5-alkenyl-2-norbornene such as 5-(1'-propenyl)-2-norbornene. More than one nonconjugated diene monomer can be incorporated in the copolymer as illustrated in U.S. Pat. Nos. 3,651,032 and 3,554,988. Copolymers can also contain units derived from a direactive diene used in small proportions to induce branching but insufficient to provide sulfur-curability or cause gelation (as in U.S. Pat. Nos. 3,819,591 and 3,843,613). The copolymers may contain units of trienes such as 1,4,6-octatriene and 1,6,8-decatriene (U.S. Pat. No. 3,846,387). Along with, or in place of the polyene units, there may be units of copolymerizable olefins containing functional polar groups. Examples of such olefins include 2-hydroxy-5-norbornene, and 2-hydroxymethyl-5-norbornene (U.S. Pat. No. 3,748,316); $CH_2=CH(CH_2)_n$ Y where $n = 0-20$ and Y = carboxyl, ester, amide, sulfonyl chloride, hydroxy (or dihydroxy) phenyl or their ethers; (U.S. Pat. No. 3,796,687);

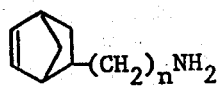

where $n = 0-20$ (U.S. Pat. No. 3,856,765);

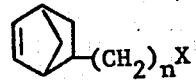

where $n = 0-20$ and $X =$ carboxyl, amido, and cyano as described in copending U.S. application Ser. No. 355,084, filed Apr. 27, 1973; functional derivatives of an unsaturated carboxylic acid having 3–20 carbon atoms, e.g., amides, nitriles, and anhydrides, and esters of lower alkanols described in U.S. Pat. No. 3,278,495.

Any of the well known coordination catalysts (Ziegler type) useful for producing ethylene copolymers such as ethylene/propylene copolymers or ethylene/propylene/nonconjugated diene terpolymers, can be used in the process of this invention. These catalysts generally comprise a combination of transition metal compounds, usually vanadium or titanium comounds such as $VOCl_3$, $VCl_4$, vanadium tris(acetylacetonate) and $TiCl_4$ and organometallic reducing agents, particularly compounds of metals of Groups I–III of the Periodic Table, organoaluminum compounds being preferred. Examples of the latter include alkylaluminum chlorides, dichlorides, and sesquichlorides such as diisobutylaluminum chloride and isobutylaluminum sesquichloride. The catalyst may be premixed or formed in situ in the copolymerization reactor.

The copolymerization is desirably carried out at a temperature of less than about 100°C., especially when a vanadium catalyst is utilized, to avoid rapid deterioration of the catalyst. Preferably, the polymerization reaction is conducted at about 20°–80°C., the particular temperature being chosen to provide a convenient reaction rate and to achieve good catalyst efficiency. Conventional pressures are utilized, usually at least about 10% by weight of total copolymer component is made in each reactor.

Any conventional solvent for the monomers can be used in the present process. Hydrocarbons, especially saturated hydrocarbons having 5 to 10 carbon atoms such as pentane, heptane, hexane, cyclohexane, octane, and decane, are preferred because of their high volatility.

The amount of hydrogen in the liquid phase in each reactor regulates the molecular weight of the resultant copolymer component. The difference in molecular weight between the copolymer components of the blend can be expressed as a ratio. Generally, the ratio of the inherent viscosity of the high molecular weight copolymer component in deciliters per gram to the inherent viscosity of the low molecular weight copolymer component in deciliters per gram is at least about 1.5. Although the particular molecular weight of the copolymer component can vary widely, the inherent viscosity of the copolymer components of the blend are usually within a range of from about 0.2 deciliters per gram to about 4.5 deciliters per gram, the ratio of the inherent viscosity of the high molecular weight component of the blend to the inherent viscosity of the low molecular weight component of the blend being at least about 1.5. The inherent viscosity of a copolymer solution is determined by measuring to ±0.1 seconds efflux times of 10 ml. of a solution of 0.1 ± 0.001 gram of copolymer in 100.0 ml. of tetrachloroethylene at 30°C. Replicate measurements are made in a Cannon Fenske type viscometer until three consecutive efflux times agree within 0.3 seconds. An identical determination is made with tetrachloroethylene solvent. Inherent viscosity in deciliters per gram is calculated as follows:

$$\eta_{inh} = \frac{\ln (\text{sample efflux time/solvent efflux time})}{\text{concentration of copolymers (grams per 100 ml.)}}$$

where $\ln$ is the logarithm to the base e.

To obtain the desired variation in molecular weight, usually, the hydrogen concentration in the liquid phase of the reactor in which low molecular weight copolymer is being made is at least about 3 times that of the hydrogen concentration in the liquid phase in the reactor in which the high molecular weight copolymer is being made. Other factors being comparable, it should be remembered that factors other than hydrogen can have an effect upon the molecular weight; for example, low reactor temperatures and high ethylene monomer concentrations favor high molecular weights.

The copolymer components of the blend can be polymerized in a plurality of separate reactors, but usually two reactors are used. utilizing more than two reactors is more costly and without an attendant increase in benefits.

The hydrogen and monomers, usually ethylene and propylene, in the gaseous state are contacted with solvent in a staged absorption column. The solvent absorbs gaseous monomer in preference to hydrogen. Therefore, the hydrogen is partitioned or separated from the gaseous monomer that dissolves in or is absorbed by the solvent and is recycled to the liquid phase of a polymerization reactor in which low molecular weight polyolefin copolymer is being made. Generally, the absorption of monomers and partitioning of the hydrogen from them is conducted in a staged system having at least two theoretical equilibrium stages at superatmospheric pressure. Pressures and temperatures can be selected over a wide range consistent with the continuous process. Usually, the pressure in the absorption column is from about 2 atmospheres (absolute) to 40 atmospheres (absolute) and the temperature in the column is between −40°C. and +150°C. Generally, for efficiency of operation, the staged absorption column is one in which gaseous hydrogen and unreacted monomer are passed countercurrent to the flow of solvent. However, cocurrent contact can also be used.

The present invention provides a unique way in which hydrogen is recovered and selectively recycled to one or more staged continuous polymerization reactors. Hydrogen is removed from the downstream reactor effluent in the staged absorption column and returned to the downstream reactor, only a small fraction being sent to the upstream reactor. Thus, a low hydrogen concentration can be maintained in the upstream reactor, so that high molecular weight copolymer is produced; at the same time a high concentration of hydrogen can be maintained in the downstream reactor so that the desired low molecular weight copolymer can be produced. At the same time the unreacted monomers can be recycled to the polymerization reactors in preselected amounts so that all important product composition is controlled without loss of monomer.

The hydrogen inventory in the entire system is maintained in a steady state by conventional means. Additional hydrogen is introduced at the same rate as hydrogen is lost during the purging of inerts. Since the upstream reactor is evaporatively cooled, there is a conventional cooling loop for recycle of the vaporized monomers; hydrogen in the reactor off-gas travels through the cooling loop, most of it returning by a gas recycle line, a small amount going back by liquid recycle lines and, as mentioned above, a still smaller amount leaving the system in the purge line.

For a more detailed and clearer understanding of the invention, the following example illustrates a preferred embodiment of the invention.

EXAMPLE

A 60/40 w/w blend of high and low molecular weight ethylene/propylene/1,4-hexadiene copolymers is prepared using two reactors in series which share a common recovery and recycle system. The high molecular weight copolymer (inherent viscosity 3.5 deciliters/gram) is made in evaporatively cooled reactor 1; the low molecular weight copolymer (inherent viscosity 0.9 deciliters/gram) is made downstream in liquid-full reactor 2 in the presence of the high molecular weight copolymer. A solution of the resulting blend is passed through countercurrent staged stripper 6, residual polymer solution going to polymer isolation while stripper off-gas (containing hydrogen, hexane solvent, and most of the ethylene and propylene) is circulated to countercurrent staged absorption column 13 where 94% of the hydrogen is partitioned and returned as gas to reactor 2, 6% of the hydrogen being absorbed in liquid for recycle to reactor 1.

Specifically, make-up ethylene gas and propylene liquid are continuously introduced into evaporatively cooled reactor 1 at the rates of 5777 lbs./hr. and 5597 lbs./hr., respectively. Methane (0.3 lb./hr.) and ethane (2.0 lbs./hr.) are present in ethylene; methane (0.9 lb./hr.), ethane (13 lbs./hr.) and propane (45.7 lbs./hr.) are present in propylene. Reactor 1 is operated at 20°C. under a pressure of 7.83 atmospheres (absolute) with a residence time of 30 minutes. Unreacted liquid monomers and solvent from countercurrent staged absorption column 13 are continuously recycled via 15 to upstream reactor 1 at 13.2°C. at the following rates: ethylene — 2,986 lbs./hr.; propylene — 45,670 lbs./hr.; 1,4-hexadiene — 5,558 lbs./hr.; hexane solvent — 120,842 lbs./hr.; hydrogen — 0.48 lb./hr.; ethane — 283.6 lbs./hr.; propane — 3461.2 lbs./hr.; nitrogen — 6.9 lbs./hr.; methane — 2.0 lbs./hr. Recycled 1,4-hexadiene — 199 lbs./hr. and recycled hexane — 4,800 lbs./hr. — are added (via a line not depicted) to reactor 1 at −15°C., together with fresh premixed coordination catalyst made by combining VCl$_4$ (12.84 lbs./hr.) and diisobutylaluminum monochloride (52.85 lbs./hr.); nitrogen — 0.7 lb./hr., enters as an inert component of these streams.

About 8,500 lbs./hr. of high molecular weight copolymer having an inherent viscosity of about 3.5 deciliters/gram is made in upstream reactor 1. The elastomeric copolymer contains about 59.8% ethylene units, 36% propylene units, and 4.2% total 1,4-hexadiene units by weight. The hydrogen concentration in the liquid phase in reactor 1 is 0.000013 mole fraction.

The off-gas from reactor 1 is circulated to the evaporative cooling loop at the following rates: ethylene — 28,426 lbs./hr.; propylene — 84,368 lbs./hr.; 1,4-hexadiene — 316 lbs./hr.; hexane — 7,357 lbs./hr.; ethane — 1,878 lbs./hr.; propane — 6,642 lbs./hr.; nitrogen — 309.6 lbs./hr.; methane — 83.2 lbs./hr.; and hydrogen — 22.3 lbs./hr. After being compressed and partly condensed the components flow to vapor/liquid separators operated at 40°C. and 27.8 atmospheres (absolute). A portion of the vapor is purged at the following rates: ethylene — 264 lbs./hr.; propylene — 433 lbs./hr.; 1,4-hexadiene — 0.1 lb./hr.; hexane — 3 lbs./hr.; ethane — 15 lbs./hr.; propane — 31.9 lbs./hr.; nitrogen — 5.2 lbs./hr.; methane — 1.2 lbs./hr.; and hydrogen — 0.4 lb./hr.; and the balance is recirculated to reactor 1.

The liquid effluent from upstream evaporatively cooled reactor 1 is pumped directly to liquid-full reactor 2. Make-up ethylene vapor (2,945 lbs./hr.) and make-up hydrogen (0.4 lb./hr. replacing that lost in the purge) are added downstream of the pump at 30°C. and 21 atmospheres (absolute). Recycle vapor line 14 containing hydrogen from countercurrent staged absorption column 13 enters downstream reactor 2 at 55.8°C. and 15.2 atmospheres (absolute) at the following rates: ethylene — 386 lbs./hr.; propylene — 565.7 lbs./hr.; 1,4-hexadiene — 6.2 lbs./hr.; hexane — 141 lbs./hr.; hydrogen — 8.3 lbs./hr.; ethane — 15 lbs./hr.; propane — 36 lbs./hr.; nitrogen — 24.8 lbs./hr.; methane — 3 lbs./hr. Fresh premixed coordination catalyst made by combining VCl$_4$ — 22.52 lbs./hr., and diisobutylaluminum monochloride — 92.67 lbs./hr. enter downstream reactor 2 at −15°C. and 18.4 atmospheres (absolute). This catalyst is carried in a liquid stream containing recycle 1,4-hexadiene — 199 lbs./hr.; recycle hexane — 4,800 lbs./hr.; and recycle nitrogen — 0.7 lbs./hr.

Reactor 2 is operated at 58°C. under a pressure of 14.6 atmospheres (absolute) with a residence time of 10 minutes. About 5,625 lbs./hr. of low molecular weight elastomeric copolymer having an inherent viscosity of about 0.9 and containing about 60.1% ethylene units, 35.8% propylene units, and 4.1% total 1,4-hexadiene units by weight is produced. The hydrogen concentration in reactor 2 which is liquid full is 0.0015 mole fraction.

The liquid effluent from liquid full downstream reactor 2, containing both high and low molecular weight copolymer, hexane solvent, unreacted monomers, hydrogen (8.8 pounds per hour), spent catalyst, ethane, propane, nitrogen, and methane is passed through a valve and enters the top of countercurrent staged stripper 6 under a pressure of 14.6 atmospheres (absolute) and at a temperature of 58°C. The liquid effluent contacts hot vapors of recycle 1,4-hexadiene (4,958 lbs./hr.) and hexane (119,704 lbs./hr.) that are fed to the bottom of stripper 6 from heater 25 via gas stream line 24 at 185°C. and 37 atmospheres (absolute). The stripping column contains the equivalent of three theoretical equilibrium stages. The copolymer blend containing large quantities of hexane solvent and 1,4-hexadiene passes downwardly through stripper 6 and exits via line 8 at 109°C. and 4.1 atmospheres (absolute). The rate of flow is as follows: ethylene — 5.5 lbs./hr.; propylene — 1,300 lbs./hr.; 1,4-hexadiene — 9,565 lbs./hr.; hexane — 231,603 lbs./hr.; ethane — 1.2 lbs./hr.; propane — 140 lbs./hr.; and copolymer — 14,125 lbs./hr. The stream from line 8 is flashed via valve V into separator 17 at 66°C. and 1 atmosphere (absolute) to remove residual unreacted volatile monomers. Liquid stream in line 18 (containing 0.1 lb./hr. ethylene, 111.3 lbs./hr. propylene, 6494 lbs./hr. 1,4-hexadiene, 156,650 lbs./hr. hexane, 13.8 lbs./hr. propane, and 14,125 lbs./hr. of copolymer) is sent to product isolation where it is steam stripped and isolated in a conventional manner. The recycle hexane and 1,4-hexadiene are dried and returned to the process.

Vapor stream 19 from separator 17 is cooled to 40°C. and condensed in recovery condenser 20 and combined via line 21 with the recycle solvent fed to absorption column 13. The flow rates in stream 19 are: ethylene, 5.4 lbs./hr.; ethane, 1.2 lbs./hr.; propylene, 1188.7 lbs./hr.; propane, 126.2 lbs./hr.; 1,4-hexadiene, 3,071 lbs./hr.; and hexane, 74,953 lbs./hr.

The flow rates in gas stream 7 leaving countercurrent staged stripper 6 are: ethylene, 3,366.5 lbs./hr.; ethane, 297.4 lbs./hr.; propylene, 45,047 lbs./hr,; propane, 3,371 lbs./hr.; 1,4-hexadiene, 769 lbs./hr.; hexane, 18,681 lbs./hr.; nitrogen, 27.9 lbs./hr.; methane, 5.0 lbs./hr.; and hydrogen, 8.8 lbs./hr.; the temperature is 49°C.; the pressure is 3.4 atmospheres (absolute). The gas stream is sent to the first stage of a compressor 12A and then to the interstage condenser-separator 16 where gas and liquid are separated. The gas stream exiting via line 9 enters the second stage of the compressor 12B, where it is further compressed, and then fed by way of line 11 to the bottom of countercurrent staged absorption column 13. Flow rates of the stream in line 11 are: ethylene, 3,137.5 lbs./hr.; ethane, 268 lbs./hr.; propylene, 35,700 lbs./hr.; propane, 2,588 lbs./hr.; 1,4-hexadiene, 111 lbs./hr.; hexane 2,685 lbs./hr.; nitrogen, 27.7 lbs./hr.; methane, 5.0 lbs/hr.; and hydrogen, 8.8 lbs/hr. The temperature of the stream is 66°C. and the pressure 16.3 atmospheres (absolute). The condensate stream in line 10 from condenser-separator 16 contains ethylene (229 lbs./hr.), ethane (29.4 lbs./hr.), propylene (9,347 lbs./hr.), propane (783 lbs./hr.), 1,4-hexadiene (658 lbs./hr.), hexane (15,996 lbs./hr.), nitrogen (0.2 lb./hr.), and methane (0.1 lb./hr.). This condensate stream is combined with recycle solvent and condensates from the recovery condenser 20 and fed via line 22 to the top of absorption column 13. The combined liquid flow rates are: ethylene — 234.5 lbs./hr.; propylene — 10,535.7 lbs./hr.; 1,4-hexadiene — 5,453 lbs./hr. (including 589.7 lbs./hr. make-up monomer); hexane — 118,298 lbs./hr.; ethane — 30.6 lbs./hr.; propane — 909.2 lbs./hr.; and nitrogen — 4.0 lbs./hr. The stream in line 22 enters the column 13 at 37.9°C. and 16.3 atmospheres (absolute). Recycled solvent and liquid monomers passing downwardly through the column absorb the gaseous monomers and a small amount of hydrogen that are ascending through the column. The column contains the equivalent of three theoretical equilibrium stages. This liquid mixture exits at the bottom of absorption column 13 via line 15, is passed through two heat exchangers, and is returned as liquid to reactor 1. The composition of the liquid stream leaving absorption column 13 at a temperature of 74°C. and a pressure of 15.7 atmospheres (absolute) is as follows: ethylene — 2,986 lbs./hr.; propylene — 45,670 lbs./hr.; hexadiene — 5,558 lbs./hr,; hexane — 120,842 lbs./hr.; and hydrogen — 0.48 lb./hr.; ethane — 283.6 lbs./hr.; propane 3,461 lbs./hr.; nitrogen — 6.9 lbs./hr.; and methane — 2.0 lbs./hr.

The bulk of the hydrogen remains unabsorbed and leaves the top of countercurrent staged absorption column 13 by way of gas recycle vapor line 14 at the rate of 8.3 pounds per hour and is returned to reactor 2 wherein the low molecular weight copolymer component of the copolymer blend is made. The composition of the gaseous stream leaving the column via vapor line 14 under a pressure of 15.2 atmospheres (absolute) and a temperature of 55.8°C. is as follows: ethylene — 386 lbs./hr.; propylene — 565.7 lbs./hr.; 1,4-hexadiene — 6.2 lbs./hr.; hexane — 141 lbs./hr.; hydrogen — 8.3 lbs./hr.; ethane — 15 lbs./hr.; propane — 36 lbs./hr.; nitrogen — 24.8 lbs./hr.; and methane — 3 lbs./hr.

CONTROL

The procedure described above in the working example is repeated in order to make a 60/40 w/w blend of high (3.5 inherent viscosity) and low (0.9 inherent viscosity) molecular weight ethylene/propylene/1,4-hexadiene copolymers having the same product composition and in the same quantity, with the major exception being that the countercurrent staged absorption column is omitted from the process and, accordingly, hydrogen, unreacted monomers and solvent leaving the vapor/liquid separator are recycled to reactor 1.

It is necessary to introduce into reactor 1 makeup ethylene gas at 30°C. and propylene liquid at 35°C. at flow rates of 10,522 lbs./hr. and 13,674 lbs./hr., respectively. (The great increase in amounts, relative to those of the above working example, reflect the wasteful gas purging required in the comparative example because of the absence of the countercurrent staged absorption column.)

Other variations made in the process are as follows. Recycled liquid components from the monomer recovery system are supplied continuously to reactor 1 at 13°C. and 7.57 atms. (absolute) pressure at the following flow rates: ethylene — 3,413 lbs./hr.; propylene — 46,167 lbs./hr.; 1,4-hexadiene — 5,624 lbs./hr.; hydrogen — 8.8 lbs./hr.; hexane — 122,285 lbs./hr.; ethane — 33.5 lbs./hr.; propane — 1733 lbs./hr.; nitrogen — 4.8 lbs./hr.; and methane — 0.2 lb./hr.

Additional liquid components at −15°C. are supplied to reactor 1 by a separate stream at the following rates: recycled 1,4-hexadiene — 197 lbs./hr.; recycled hexane — 4,802 lbs./hr.; nitrogen — 0.7 lb./hr.; fresh premixed coordination catalyst made by combining the $VCl_4$ — 12.84 lbs./hr.; and diisobutylaluminum chloride — 52.85 lbs./hr.

The mole fraction of hydrogen in the liquid phase in reactor 1 is 0.000013.

The off-gas from reactor 1 is circulated through evaporative cooling loop where the gas is compressed, partly condensed, and treated in vapor/liquid separators. A portion of the separator vapor must be purged to maintain a steady state of inerts and hydrogen in the overall system. The loss occurs at the following rates: ethylene — 5,383 lbs./hr.; propylene — 8,477 lb./hr.; 1,4 -hexadiene — 3 lbs./hr.; hydrogen — 8.7 lbs./hr.; hexane solvent — 67 lbs./hr.; ethane — 33.6 lbs./hr.; propane — 294 lbs./hr.; nitrogen — 5.4 lbs./hr.; and methane — 2.6 lbs./hr.

The liquid effluent in evaporatively cooled reactor 1 is pumped to liquid-full reactor 2 and is joinedf by a make-up stream supplying 3,338 lbs./hr. of ethylene and 8.7 lbs./hr. of hydrogen at 30°C. and 2 atms. (absolute) pressure. (No recycle vapor is supplied to reactor 2.) A liquid recycle stream enters reactor 2 and contains 1,4-hexadiene — 197 lbs./hr.; hexane — 4,802 lbs./hr.; nitrogen — 0.7 lb./hr.; fresh premixed coordination catalyst made by combining $VCl_4$ — 22.52 lbs./hr. and diisobutylaluminumchloride — 92.67 lbs./hr. Hydrogen is present in the liquid phase in reactor 2 at a concentration of 0.0015 mole fraction.

The liquid effluent from liquid-full downstream reactor 2 containing both high and low molecular weight copolymer, hexane solvent, unreacted monomers, hydrogen, spent catalyst, ethane, propane, nitrogen, and methane is passed through a valve and enters the top of the counter-current staged stripper under a pressure of 14.6 atms. (absolute) and at a temperature of 58°C. The liquid effluent from the reactor contacts hot vapors of recycle 1,4-hexadiene (4,822 lbs./hr.) and hexane (118.350 lbs./hr.) entering the bottom of the stripper. The stripper contains the equivalent of three theoretical equilibrium stages. The copolymer blend conaining large quantities of hexane solvent and 1,4-hexadiene passes downwardly through the stripper exiting in line 8. The non-volatilized liquid exiting from the stripper flows at 108°C. and 4.1 atmospheres (absolute) at the following rates: ethylene — 7.2 lbs./hr.; propylene — 1,571 lbs./hr.; 1,4-hexadiene — 9,560 lbs./hr.; hexane — 233,576 lbs./hr.; ethane — 0.2 lb./hr.; propane — 83 lbs./hr.; and copolymer — 14,125 lbs./hr. The mixture is flashed to atmospheric pressure and the resulting gas/liquid mixture passes to a vapor/liquid separator at 66°C. The liquid polymer solution is isolated and the gas from the separator is condensed at 40°C. and recycled to reactor 1.

The off-gases from the stripper flow at 47°C. and 3.4 atms. (absolute) pressure at the following rates: ethylene, 34,062 lbs./hr.; propylene, 44,733 lbs./hr.; 1,4-hexadiene, 689 lbs./hr.; hexane, 16,598 lbs./hr.; ethane, 33.3 lbs./hr.; propane, 1658 lbs./hr.; nitrogen, 0.1 lb./hr.; methane, 0.2 lb./hr.; and hydrogen, 8.8 lbs./hr. The stream is compressed and partly condensed and is passed to a liquid-vapor separator. The liquid is recycled to reactor 1 and the vapor is compressed and returned to reactor 1.

It can be seen from a comparison between the working example and the control that an outstanding advantage of this invention is its efficient use of hydrogen, volatile monomers and solvent. Most important, the working example of the present invention illustrates that only 0.4 pound per hour of hydrogen is lost from the polymerization system. In contrast, in the control a loss of 8.7 pounds per hour of hydrogen occurs. Further, in the control process recycle of monomer containing an excessive amount of hydrogen to either reactor cannot be done because the ratio of hydrogen is excessive for making high molecular weight copolymer, and the ratio of monomer is excessive for making low molecular weight copolymer. The stream containing hydrogen in the control must be vented in order to purge the unit so that high molecular weight copolymer can be produced and the hydrogen inventory in the entire system be held at steady state. Thus, not only hydrogen is lost, but also valuable volatile monomers and solvent.

In both the working example and the control disclosed herein each process produces 14,125 pounds of copolymer during each hour. From the data given in the experiments it can be calculated that the control requires that 12,863 pounds per hour of volatile monomers be purged from the system to make the high and low molecular weight copolymer blend, as contrasted to 697.1 pounds per hour using the process of the present invention. Stated differently, the monomers purged per pound of copolymer using the control has a value of 1, whereas using the method of the present invention the value is about 0.05. Since better utilization of valuable hydrogen and increasingly scarce petroleum feedstock is important from both the economic standpoint and one of conservation, this invention provides a process for making blends of high and low molecular weight copolymers that results in substantial savings.

What is claimed is:

1. In a continuous process for making blends of high and low molecular weight copolymers and recycling the chain-transfer agent gaseous hydrogen for reuse in the process, said process comprising polymerizing ethylene and at least one higher olefin monomer in a solvent for the monomers in separate polymerization reactors in the presence of a coordination catalyst, at least one, but not all, of said reactors containing the chain-transfer agent hydrogen in an amount sufficient to produce low molecular weight copolymer, mixing the resulting solution of high and low molecular weight copolymers, flashing unreacted monomers and hydrogen from the mixture and isolating the blend of high and low molecular weight copolymers and solvent from the unflashed residue, the improvement which comprises circulating the flashed gaseous unreacted monomers and hydrogen together through a staged absorption column and simultaneously passing said solvent through said column to absorb monomer gas in the solvent and thus separate unabsorbable hydrogen gas from monomers and recycling hydrogen in the system to a polymerization reactor for making low molecular weight copolymer.

2. A process of claim 1 wherein gaseous hydrogen and unreacted monomer are passed countercurrent to the flow of solvent in the absorption column.

3. A process of claim 2 wherein the solvent is a hydrocarbon.

4. A process of claim 2 wherein the solvent is hexane.

5. A process of claim 2 wherein the solvent contains unreacted monomer.

6. A process of claim 2 wherein the coordination catalyst contains vanadium.

7. A process of claim 2 wherein the higher olefin is propylene.

8. A process of claim 7 wherein the copolymer contains units of a nonconjugated diene.

9. A process of claim 8 wherein the nonconjugated diene is 1,4-hexadiene.

10. A process of claim 8 wherein the nonconjugated diene is ethylene norbornene.

11. A process of claim 2 wherein two polymerization reactors are used.

12. A process of claim 2 wherein two polymerization reactors are used in series.

13. A process of claim 2 wherein the pressure employed in the absorption column is about from 2 to 40 atmospheres (absolute).

* * * * *